United States Patent
Cao

(10) Patent No.: US 9,001,525 B2
(45) Date of Patent: Apr. 7, 2015

(54) ELECTRONIC DEVICE HAVING DETACHABLE BATTERY

(71) Applicants: Fu Tai Hua Industry (Shenzhen) Co., Ltd., Shenzhen (CN); Hon Hai Precision Industry Co., Ltd., New Taipei (TW)

(72) Inventor: Yan-Bang Cao, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 194 days.

(21) Appl. No.: 13/727,594

(22) Filed: Dec. 27, 2012

(65) Prior Publication Data

US 2014/0160712 A1 Jun. 12, 2014

(30) Foreign Application Priority Data

Dec. 7, 2012 (CN) .......................... 2012 1 0521900

(51) Int. Cl.
*H05K 7/02* (2006.01)
*G06F 1/16* (2006.01)
*H04M 1/02* (2006.01)
*H01M 2/10* (2006.01)

(52) U.S. Cl.
CPC ............ *G06F 1/1658* (2013.01); *H04M 1/0202* (2013.01); *G06F 1/1626* (2013.01); *G06F 1/1635* (2013.01); *H01M 2/1022* (2013.01)

(58) Field of Classification Search
CPC ............ H01M 2/1022; H01M 2/1066; H01M 2/1044; H04M 1/0262
USPC ............. 361/757, 679.3, 679.55, 769.56, 361/769.57, 807; 174/565, 66, 67, 562, 174/564; 455/575.1, 575.8
See application file for complete search history.

(56) References Cited

U.S. PATENT DOCUMENTS

| | | | |
|---|---|---|---|
| 5,149,602 A * | 9/1992 | Savovic et al. | 429/96 |
| 7,697,281 B2 * | 4/2010 | Dabov et al. | 361/679.55 |
| 7,869,206 B2 * | 1/2011 | Dabov et al. | 361/679.55 |
| 8,271,052 B2 * | 9/2012 | Jiang et al. | 455/572 |
| 2011/0151945 A1 * | 6/2011 | Jiang et al. | 455/575.1 |
| 2012/0101551 A1 * | 4/2012 | Aghassian et al. | 607/60 |

* cited by examiner

*Primary Examiner* — Lisa Lea Edmonds
*Assistant Examiner* — Christopher L Augustin
(74) *Attorney, Agent, or Firm* — Novak Druce Connolly Bove + Quigg LLP

(57) ABSTRACT

An electronic device includes a first cover, a double sided pressure sensitive adhesive (PSA) tape, a battery, and a second cover. The second cover is attached to the first cover. The battery is arranged between the first cover and the second cover. The second cover defines a groove. A shape of the groove is substantially same as a shape of the PSA tape. The PSA tape covers the groove. Thereby the PSA tape and the groove cooperatively form an air flowing channel having an inlet and an outlet. The battery is fixed to the second cover by the PSA tape. An adhesive force of the PSA tape applied between the battery and the second cover is decreasable by flowing air with temperature greater than a preset value through the air flowing channel so as to enable the battery to detach from the second cover.

4 Claims, 4 Drawing Sheets

ELECTRONIC DEVICE HAVING DETACHABLE BATTERY

BACKGROUND

1. Technical Field

The present disclosure relates to electronic devices, and particularly to an electronic device having a detachable battery.

2. Description of Related Art

The batteries of electronic devices such as cell phones are often stuck in the electronic device using adhesive tape. However, if the battery needs to be removed for maintenance, the battery needs to be removed from the electronic device. The battery may be damaged because the strong adhesive of the adhesive tape. Therefore, an electronic device having detachable battery is needed to resolve the above problem.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The embodiments of the present disclosure are described with reference to the accompanying drawings.

Figure 1:
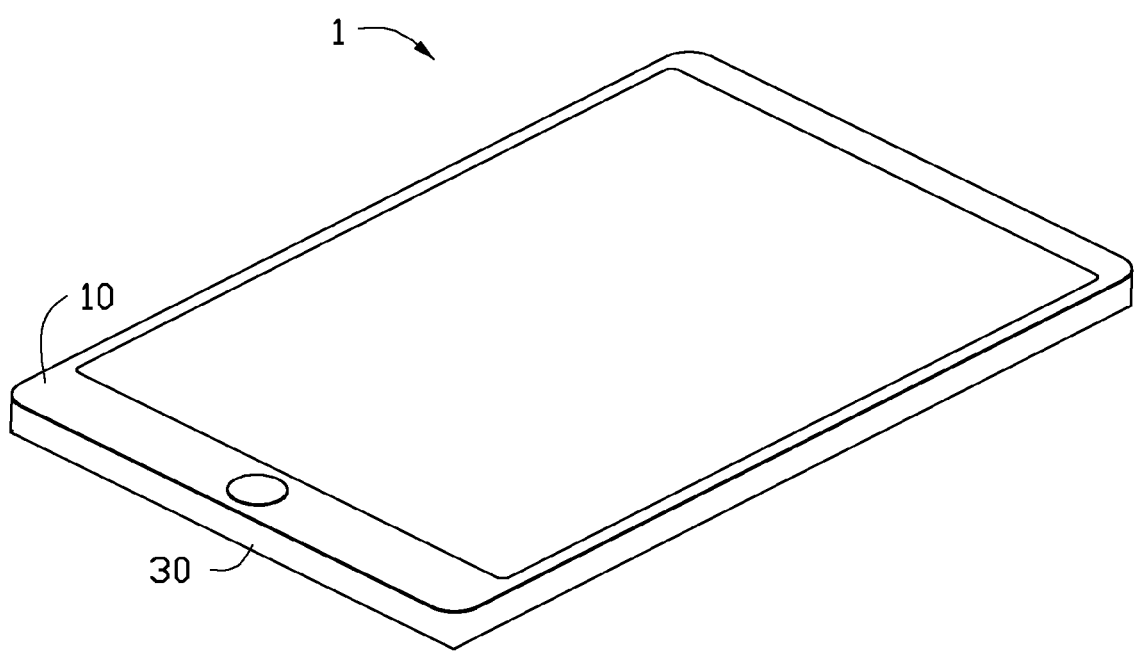
FIG. 1 is a schematic view of an electronic device in accordance with an exemplary embodiment.
Figure 2:
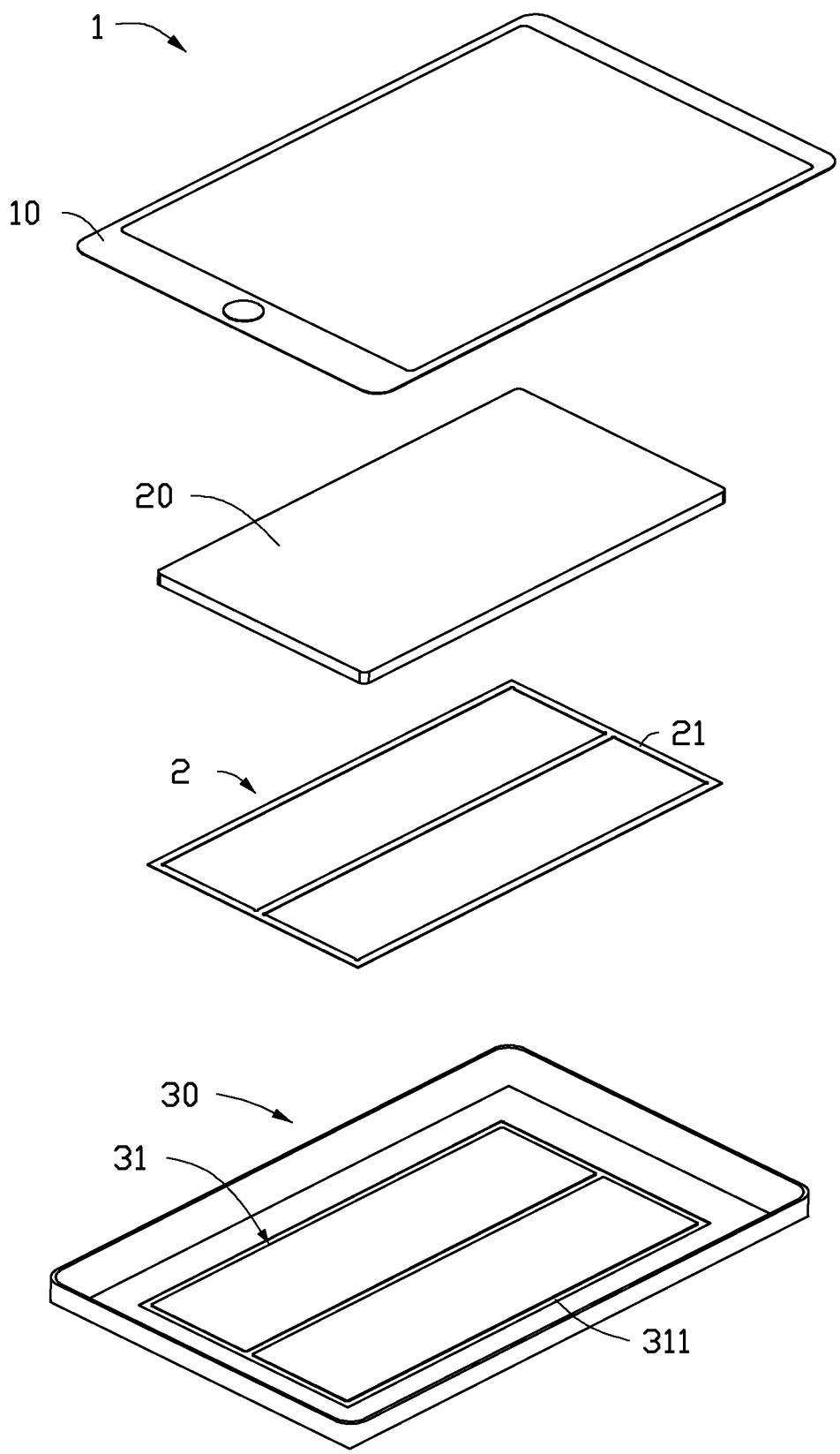
FIG. 2 is an exploded view of the electronic device of FIG. 1.

Referring to FIGS. 1-2, an electronic device 1 is shown in accordance with an exemplary embodiment. The electronic device 1 includes a first cover 10, a double sided pressure sensitive adhesive (PSA) tape 2, a battery 20, and a second cover 30. The first cover 10 is coupled to the second cover 30. The first cover 10 and the second cover 30 cooperatively define a receiving space (not label). The battery 20 is received in the receiving space. The battery 20 is fixed to the second cover 30 using the PSA tape 2. The stickiness of the PSA tape 2 increases as the temperature of the PSA tape 2 increases when the temperature of the PSA tape 2 is less than a preset value, and decreases as the temperature of the PSA tape 2 increases when the temperature of the PSA tape 2 is greater than the preset value.

Figure 3:
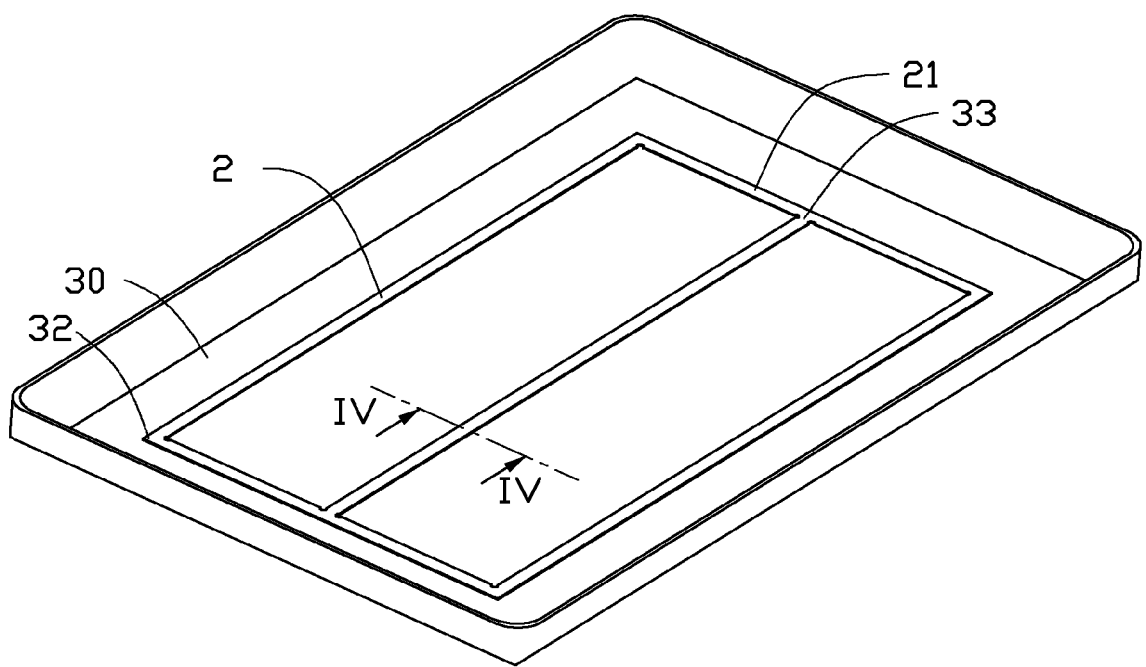
FIG. 3 is a schematic view of the electronic device of FIG. 1, with a first cover and a battery omitted.
Figure 4:
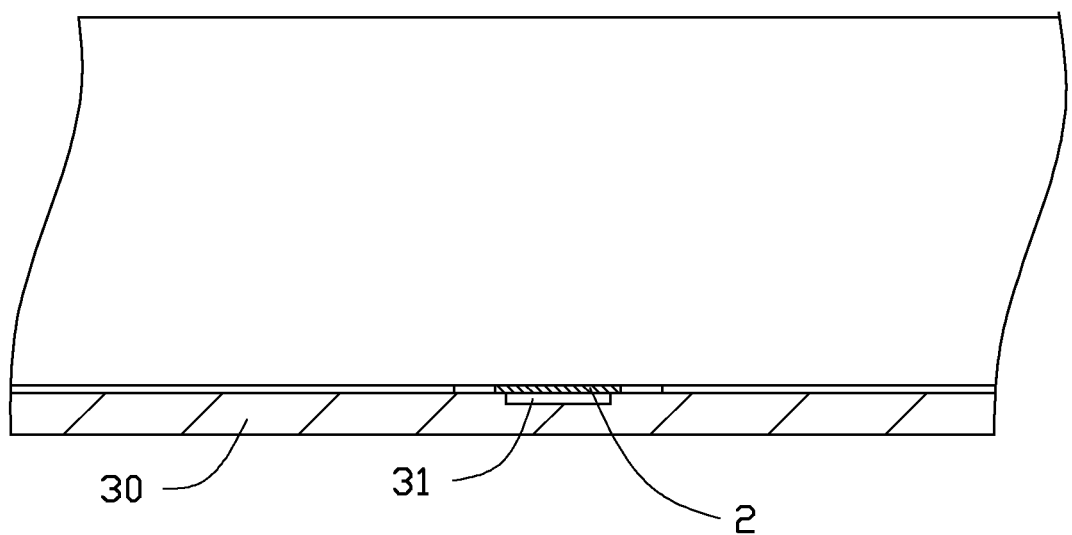
FIG. 4 is a cross-section view of the electronic device of FIG. 3, taken along line IV-IV.

Referring to FIGS. 3-4, the second cover 30 defines a number of slots 311. The slots 311 are arranged to form a groove 31. In the embodiment, the groove 31 includes three slots 311 in parallel and one slot 311 at each end of the parallel slots 311 to form a bisected rectangle. A length of the groove 31 formed by the slots 311 is less than or equal to a length of the battery 20, and a width of the groove 31 formed by the slots 311 is less than or equal to a width of the battery 20. A shape of the PSA tape 2 is substantially same as a shape of the groove 31. The PSA tape 2 includes a number of sides 21 corresponding to the slots 311. A width of each side 21 of the PSA tape 2 is greater than a width of the corresponding slot 311 of the groove 31, and a length of each side 21 of the PSA tape 2 is equal to a length of the corresponding slot 311 of the groove 31. Thus, when the PSA tape 2 is stuck to the groove 31 of the second cover 30, the PSA tape 2 completely covers the groove 31, and the PSA tape 2 and the groove 31 cooperatively form an air flowing channel having an inlet 32 and an outlet 33.

To remove the battery 20 from the second cover 30, air with a temperature greater than the preset value needs to be injected into the groove 31 from the inlet 32. The injected air flows along the air flowing channel and exits from the outlet 33, and heats the PSA tape 2 covering the groove 31. Thus the adhesive force of the PSA tape 2 applied between the battery 20 and the second cover 30 is descreasable so as to enable the battery 20 to detach from the second cover 30.

In an alternative embodiment, the shape of the groove 31 can be varied according to need. Then the shape of the PSA tape 2 is changed to correspond to the shape of the groove 31.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
   a first cover;
   a double sided pressure sensitive adhesive (PSA) tape;
   a battery; and
   a second cover attached to the first cover, the battery being arranged between the first cover and the second cover, the second cover defining a groove, a shape of the groove being substantially same as a shape of the PSA tape, the PSA tape covering the groove, thereby the PSA tape and the groove cooperatively forming an air flowing channel having an inlet and an outlet, the battery being fixed to the second cover by the PSA tape;
   wherein an adhesive force of the PSA tape applied between the battery and the second cover is decreasable by flowing air with temperature greater than a preset value through the air flowing channel so as to enable the battery to detach from the second cover.

2. The electronic device as described in claim 1, wherein the groove comprises at least one slot, the PSA tape comprises at least one side corresponding to the at least one slot, a width of each of the at least one slot is less than a width of the corresponding side of the PSA tape.

3. The electronic device as described in claim 1, wherein a length of the groove is less than or equal to a length of the battery, and a width of the groove is less than or equal to a width of the battery.

4. The electronic device as described in claim 1, wherein the groove includes three slots in parallel and one slot at each end of the parallel shots to form a bisected rectangle.

* * * * *